July 31, 1962

G. P. McCOUCH 3,046,810

DETENT MECHANISM

Filed July 14, 1958

INVENTOR
Gordon P. McCouch

BY
Mead, Browne, Schuyler & Beveridge
ATTORNEYS

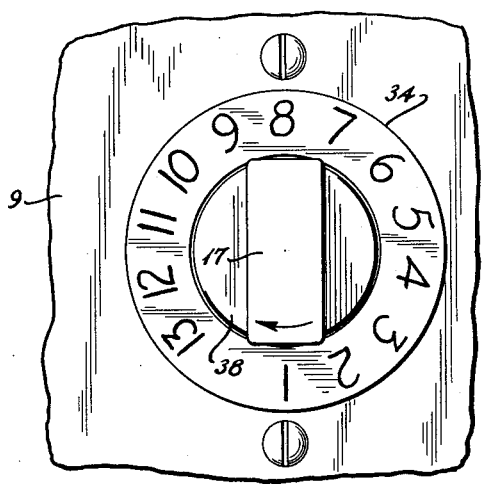
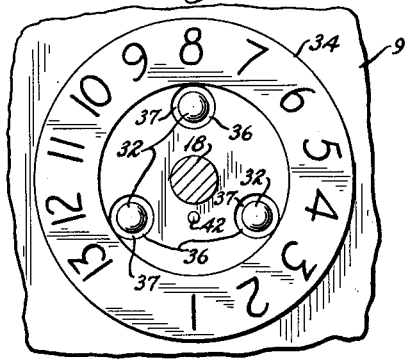
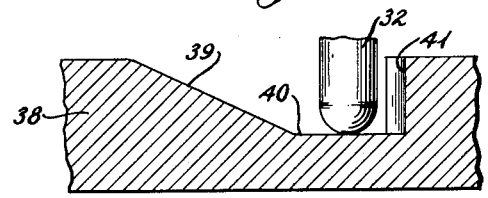
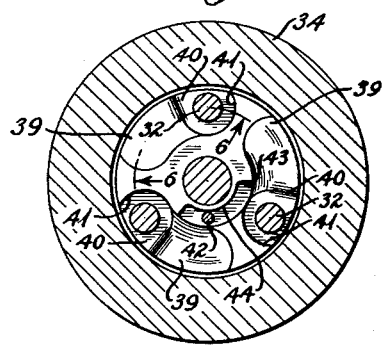
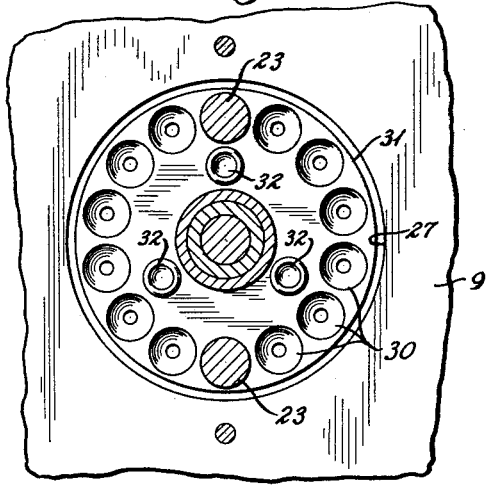
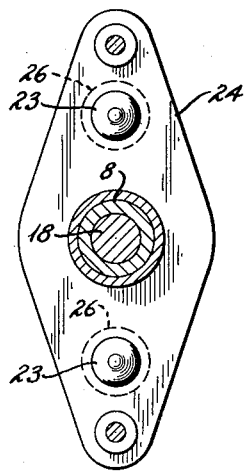

United States Patent Office 3,046,810
Patented July 31, 1962

---

3,046,810
DETENT MECHANISM
Gordon P. McCouch, Concord, Mass., assignor, by mesne assignments, to Aircraft Radio Corporation, Boonton, N.J., a corporation of New Jersey
Filed July 14, 1958, Ser. No. 748,239
8 Claims. (Cl. 74—527)

This invention relates to a detent mechanism for a normally rotatable shaft and particularly concerns a detent mechanism for an automatic shaft positioning device which is effective to accurately locate the angular position of a shaft during adjustment of washers to selected angular positions on the shaft and rendered ineffective when the washers are locked on the shaft and the device is conditioned for automatic operation.

In automatic shaft positioning apparatus of this type adjustable stop washers are engaged in definite angular positions and the shaft is then adjusted to a selected angular position relative to the position of the washer. It is important that the selected angular position of the shaft be easily and accurately located as adjustments of the stop washers are made, and that the shaft then rotate freely after the washers are locked in position.

Accordingly, it is an object of this invention to provide a positively operative detent mechanism which will enable the operator to quickly and accurately turn the shaft to a selected angular position and still permit relatively free rotation of the shaft during automatic operation of the shaft positioning mechanism.

Another object is to provide automatic shaft positioning apparatus with a device moved to an operative position to accurately locate desired angular positions of the shaft after locating devices on the shaft are released and rendered ineffective to permit free rotation of the shaft when the locating devices are locked on the shaft.

Another object is to provide a detent device which is accurate, light in weight, easy to operate and positive in action.

In the attainment of these objects, an important feature of the invention resides in the arrangement of a detent device mechanically shifted to locate a number of different positions of the shaft when the locking screw is turned in a direction to release the washers to permit relative rotation between the shaft and the washers. Preferably this detent device is rendered effective when the locking screw is turned in a direction to release the washers, turning of the locking screw being normally limited to an angle substantially less than a third of a turn. During rotation of the locking screw, the washers are released and the detent device is operated.

Another feature of the invention resides in the arrangement of a plate slidable along the shaft with cooperating detent devices on the plate and a fixed member adjacent the shaft, the plate being normally urged in a direction away from the fixed member and moved along the shaft toward the fixed member upon rotation of the turning screw to release the locating devices. The detent devices are spring loaded to permit the operator to index the shaft to any one of a plurality of angular positions and accurately locate the shaft at the selected position.

More specifically, a guide is arranged on the shaft with rods extending from the detent plate and slidable in the guide with springs normally urging the detent plate away from the fixed member. A cam engages the rods and upon rotation of the locking screw in a direction to release the washers moves the rods against the force of the spring to shift the plate toward the fixed member. Arranged on the fixed member is a spring loaded detent element for engaging any one of a number of recesses in the detent plate and, when so engaged, accurately locating the angular position of the shaft.

Other objectives, advantages and features of the invention will become apparent from the following description taken in conjunction with the accompanying drawing in which:

FIG. 1 is a perspective view of an automatic shaft repositioning mechanism embodying the invention in its preferred form;

FIG. 2 is a vertical section of the mechanism shown in FIG. 1;

FIG. 3 is a partial front elevation of the device shown in FIG. 1;

FIG. 4 is a vertical section taken along line 4—4 of FIG. 2;

FIG. 5 is a vertical section taken along line 5—5 of FIG. 2;

FIG. 6 is an enlarged partial section taken on arc 6—6 of FIG. 5;

FIG. 7 is a vertical section taken along line 7—7 of FIG. 2; and

FIG. 8 is a vertical section taken along line 8—8 of FIG. 2.

In the embodiment of the invention shown in the drawings, a control shaft 7 and a controlled shaft 8 are mounted on a stationary panel 9 of the housing for the mechanism. Automatic repositioning mechanism for selecting the position at which controlled shaft 8 is to be repositioned includes a selector drum assembly 10 mounted on the shaft 7 and cooperating with tuner drum assembly 11, mounted on the shaft 8.

Tuner drum assembly 11 includes alternately arranged stop washers 12 and spacers 13. Each stop washer 12 has projecting from its periphery an abutment 14 formed with a radial slot 15 for engagement with a corresponding tooth 16 on the selector drum assembly 10. Stop washers 12 are adjusted to different angular positions according to the desired angular position to which shaft 8 is to be repositioned by the mechanism.

Once correctly positioned, stop washers 12 are locked by turning locking lever 17 on the outer end of a locking screw 18 having threads 19 engaged with the threaded interior of bore 20 in the shaft 8. When so turned, the inner end of locking screw 18 forces a bar 21 against an end disc 22 of the tuner drum assembly 11 and thereby clamps the stop washers 12 and spacers 13 together to retain the abutments 14 in predetermined angular relationship.

Adjustment of stop washers 12 is effected by operating the automatic positioning mechanism until a selected tooth 16 on selector drum 10 engages the corresponding abutment in tuner drum 11. Then locking screw 18 is turned to release the pressure on disc 22 and thereby unclamp the stop washers 12 of the tuner drum assembly to permit rotation of the shaft to a selected angular location while the stop washer is engaged with tooth 16.

To aid the operator in accurately locating shaft 8, a pair of detent plungers 23, 23 are slidably mounted in plates 24 and 25 forming a yoke secured to fixed panel 9. Outward projection of plungers 23 is limited by engagement of collars 26 on the plungers 23 with the inner surface of plate 24. Plungers 23 are normally urged in a direction outwardly through opening 27 in the panel 9 by compression springs 28 surrounding plungers 23 between plate 25 and collars 26 on the plungers.

Outer ends of detent plungers 23 are tapered to points 29 cooperating with correspondingly tapered recesses 30 formed in the face of a detent plate 31 which is slidable axially along shaft 8. Extending outwardly from detent plate 31 are guide rods 32 projecting through openings 33 in a knob 34 fixed on shaft 8. Knob 34 serves as a guide member for rods 32 which are normally forced in a direction to move detent plate 31 away from detent plungers 23 and toward knob 34 by springs 35 disposed in counterbores 36 in openings 33 and engaging collars 37 on the rods. Thus, detent plate 31 is normally moved by springs 35 in a direction to disengage the cooperating detent devices in the form of tapered ends on plungers 23 and correspondingly tapered recesses 30 in the face of detent plate 31.

For the purpose of shifting the detent plate 31 toward the stationary panel 9 and into engagement with detent plungers 23, a cam 38 is secured to locking screw 18 and has multiple ramps 39 extending from an inner surface 40 to the outer surface of the cam and arranged to cooperate with the outer ends of rods 32.

Relative rotation between locking screw 18 and shaft 8 is limited to an angle less than a third of a turn by engagement of rods 32 with a shoulder 41 at the end of inner surface 40 on cam 38 and engagement of pin 42 projecting from knob 34 to engage an abutment 43 at one end of a recess 44 in the face of cam 38. Conventionally, about a quarter of a turn of locking screw 18 is necessary to fully unclamp the stop washers 12. Turning of locking screw 18 in a release direction moves rods 32 from bottom surfaces 40 over inclined ramp surfaces 39 to shift detent plate 31 into engagement with detent plungers 29 as stop washers 12 and spacers 13 are released. Pin 42 engages abutment 43 on cam 38 to limit turning of the locking screw and insure that rods 32 do not move beyond the spaces between the ramp surface and the next flat bottom surface.

There is, therefore, a relationship between the pitch of the threads 19 of the locking screw, and the length of cam ramp 39 so the rods 32 are shifted simultaneously during the turning of locking screw 18 to release the stop washers. The slope of ramp 39 is sufficient to shift rods 32 to engage recesses 30 on detent plate 31 with the ends of detent plungers 23. Likewise, after the stop washers have been properly positioned in correct angular relationship with respect to shaft 8, locking lever 17 may be rotated to turn locking screw 18 in a direction to clamp the washers. Turning of locking screw 18 in clamping direction rotates cam 38 so ramp 39 is again moved beneath rods 32 until rods 32 engage the flat surface 40 at the bottom of the ramp. This is effective to shift detent plate 31 away from plungers 23. Turning of locking screw 18 is also effective through its pressure on disc 22 to clamp the washers in the selected position and the mechanism is readied for automatic repositioning operation.

As illustrated in FIG. 7, recesses 30 are angularly spaced about the face of detent plate 31 to accurately locate the shaft 8 in any one of several different angular positions to a desired angular position relative to a stop washer having its abutment engaged by a corresponding tooth on the selector drum. This procedure may be repeated until each of the stop washers is properly located on shaft 8. The outer face of knob 34 is suitably numbered to indicate the angular position of the shaft.

Since many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. In an automatic shaft positioning apparatus having a plurality of washers adjustable angularly about a shaft and a locking screw extending longitudinally of the shaft for clamping said washers to prevent relative rotation between the washers and the shaft, a releasable detent mechanism for said shaft comprising a detent plate slidable along said shaft and secured against rotation relative to said shaft, a stationary member adjacent said shaft, cooperating detent devices on said plate and said stationary member engageable by movement of said plate axially of said shaft for locating the angular position of said shaft with respect to said stationary member, and means operated by rotation of said locking screw in a direction to release said washers for shifting said plate for engaging said detent devices.

2. In an automatic shaft positioning apparatus having a plurality of washers adjustable angularly about a shaft and a locking screw extending longitudinally of the shaft for clamping said washers to prevent relative rotation between the washers and the shaft, a releasable detent mechanism for locating the angular position of said shaft comprising a detent plate slidable along said shaft and secured against rotation relative to said shaft, a fixed member adjacent said shaft, cooperating detent devices on said plate and said fixed member engageable by movement of said plate along said shaft to locate said shaft with respect to said fixed member, spring means urging said plate in a direction to disengage said detent devices, and means operated by rotation of said locking screw in a direction to release the washers for shifting said plate axially of said shaft against the force of said spring means to engage said detent devices.

3. In an automatic shaft positioning apparatus having a plurality of locking washers adjustable angularly about a shaft and a longitudinally extending locking screw for clamping said washers to prevent relative rotation between the washers and the shaft, a detent mechanism for locating the angular position of the shaft comprising a fixed member adjacent said shaft, a detent plate slidable along said shaft and secured against rotation relative to said shaft, cooperating detent devices on said plate and said member engageable in different angular positions of said shaft, and spring loaded to permit indexing rotation of said shaft to different angular positions, and means operated by rotation of said locking screw in a direction to release the washers for shifting said plate along said shaft toward said fixed member to engage said detent devices.

4. In an automatic shaft positioning apparatus having a plurality of washers adjustable angularly about a shaft and a locking screw extending longitudinally of the shaft for clamping said washers to prevent relative rotation between the washers and the shaft, detent mechanism for locating angular positions of said shaft comprising a fixed member adjacent said shaft, a detent plate slidable along said shaft and secured against rotation relative to said shaft, cooperating detent devices on said member and said plate engageable in different angular positions of said shaft, spring means loading said devices to permit release thereof and indexing of said shaft to said different angular positions, spring means normally urging said plate away from said fixed member to disengage said detent devices, and means operated by rotation of said locking screw in a direction to release the washers for moving said plate against the force of said spring means toward said fixed member to engage said detent devices.

5. In an automatic shaft positioning apparatus having a plurality of washers adjustable angularly about a shaft and a locking screw extending longitudinally of the shaft for clamping said washers to prevent relative rotation between the washers and the shaft, detent mechanism for locating angular positions of the shaft comprising a fixed member adjacent said shaft, a guide secured to said shaft, a detent plate slidable along said shaft, pins extending from said plate and slidable in said guide, spring means normally urging said plate in a direction away from said member and toward said guide, cooperating detent devices on said member and said plate engageable in different angular positions of said shaft, spring means loading said devices to permit indexing of said shaft to said different positions, and means including a cam cooperating with said pins operated by rotation of said locking screw in a direction to release the washers for moving said pins and said plate against the force of said spring means toward said fixed member to engage said detent devices.

6. Detent mechanism for locating angular positions of a shaft comprising a guide on the shaft, a detent plate slidable along said shaft, a rod extending from said plate and slidable in said guide, a fixed member adjacent said shaft, cooperating detent devices on said plate and said member engageable to locate angular positions of said shaft, spring means normally urging said rod in a direction to move said plate away from said member, and means for moving said rod against the action of said spring to move said plate toward said member and engage said detent devices.

7. A detent mechanism for locating angular positions of a shaft comprising a guide on the shaft, a plate slidable along the shaft, a rod extending from said plate and slidable in said guide, a fixed member adjacent said shaft, a spring loaded detent element carried by said fixed member and normally urged toward said plate, said plate being formed with a plurality of spaced recesses for engaging said detent element, spring means normally urging said rod in a direction to move said plate away from said member, and means for shifting said rod against the action of said spring means to move said plate into engagement with said spring loaded detent element.

8. A detent mechanism for locating angular positions of a shaft comprising a guide on said shaft, a plate slidable along said shaft, a rod extending from said plate and slidable in said guide, a fixed member adjacent said shaft, cooperating detent elements on said plate and said member engageable to locate angular positions of said shaft, spring means acting on said rod in a direction to move said plate away from said member and cam means for shifting said rod in a direction to move said plate in a direction to engage said elements, said cam means being effective upon limited turning thereof relative to said shaft and said guide.

References Cited in the file of this patent

UNITED STATES PATENTS

| | | |
|---|---|---|
| 1,406,103 | Tampier | Feb. 7, 1922 |
| 2,642,503 | Dietrich | June 16, 1953 |
| 2,749,825 | Hirasuna | June 12, 1956 |
| 2,770,982 | Mastney | Nov. 20, 1956 |
| 2,813,431 | Griswold | Nov. 19, 1957 |
| 2,833,158 | Damon | May 6, 1958 |
| 2,837,933 | Patla | June 10, 1958 |
| 2,857,782 | Glueckstein et al. | Oct. 28, 1958 |
| 2,863,058 | Thias | Dec. 2, 1958 |

FOREIGN PATENTS

| | | |
|---|---|---|
| 729,489 | Great Britain | May 4, 1955 |